United States Patent
Lin et al.

(10) Patent No.: US 8,086,241 B2
(45) Date of Patent: Dec. 27, 2011

(54) HANDOFF METHODS, AND DEVICES UTILIZING SAME

(75) Inventors: Meng-Shiang Lin, Yung-Ho (TW); Ching Yao Huang, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 308 days.

(21) Appl. No.: 10/991,795

(22) Filed: Nov. 18, 2004

(65) Prior Publication Data
US 2006/0105768 A1    May 18, 2006

(51) Int. Cl.
*H04W 72/00*    (2009.01)
(52) U.S. Cl. .................. 455/452.2; 455/432.1; 455/436; 455/437; 455/442; 455/453; 370/331; 370/332; 370/333
(58) Field of Classification Search .......... 455/436–439, 455/442, 446, 450–453
See application file for complete search history.

(56) References Cited

U.S. PATENT DOCUMENTS

| | | | |
|---|---|---|---|
| 5,267,261 A | 11/1993 | Blakeney, II et al. | |
| 5,978,679 A | 11/1999 | Agre | |
| 6,151,502 A | 11/2000 | Padovani et al. | |
| 6,208,860 B1 * | 3/2001 | Kim et al. | 455/440 |
| 6,438,378 B1 * | 8/2002 | Kouno | 455/439 |
| 6,496,493 B1 * | 12/2002 | Chung | 370/332 |
| 6,507,740 B2 | 1/2003 | Shi | |
| 6,564,042 B1 * | 5/2003 | Jou et al. | 455/238.1 |
| 6,771,963 B1 * | 8/2004 | Cheng et al. | 370/332 |
| 7,023,822 B1 * | 4/2006 | Czaja et al. | 370/332 |
| 7,127,267 B2 * | 10/2006 | McGowan et al. | 455/522 |
| 2002/0049060 A1 * | 4/2002 | Grob et al. | 455/442 |
| 2002/0068571 A1 * | 6/2002 | Ohlsson et al. | 455/442 |
| 2002/0102977 A1 * | 8/2002 | Shi | 455/437 |
| 2002/0173309 A1 * | 11/2002 | Shahidi et al. | 455/442 |
| 2003/0142656 A1 * | 7/2003 | Padovani et al. | 370/347 |
| 2004/0146126 A1 * | 7/2004 | Wheatley et al. | 375/343 |
| 2004/0259547 A1 * | 12/2004 | Lau et al. | 455/436 |
| 2006/0052104 A1 * | 3/2006 | Kono | 455/436 |
| 2006/0187869 A1 * | 8/2006 | Czaja et al. | 370/320 |

FOREIGN PATENT DOCUMENTS
| | | |
|---|---|---|
| TW | 321807 | 12/1997 |
| WO | WO 02/47424 | 6/2002 |

OTHER PUBLICATIONS
English abstract of Dec. 1, 1997.
TW Office Action mailed Dec. 18, 2007.

* cited by examiner

*Primary Examiner* — Dai A Phuong
(74) *Attorney, Agent, or Firm* — Thomas|Kayden (57) ABSTRACT

A handoff method. A mobile station calculates and records the strength of a pilot signal from a cell as reference strength if a handoff occurs in a first system. The mobile station further adjusts the reference strength according to the effect caused by forward and reverse links between a base station and the mobile station, and performs a handoff between the first and a second system if the strength of the pilot signal reaches the reference strength.

4 Claims, 6 Drawing Sheets

HANDOFF METHODS, AND DEVICES UTILIZING SAME

BACKGROUND

The present disclosure relates generally to communication management, and, more particularly, to methods for border cell handoff between third generation (3G) and second generation (2G) communication systems, and devices utilizing same.

One commonly used of cellular radiotelephone communication system is the Code Division Multiple Access (CDMA) system. In the CDMA system, the radio signals share the same frequency spectrum simultaneously, in contrast to Frequency Division Multiple Access (FDMA) or Time Division Multiple Access (TDMA) systems. One CDMA standard, known as a 2G standard, is designated as TIA/EIA-95-A/B. More recently, a 3G CDMA standard is proposed and designated as CDMA2000.

A mobile station communicates with a base station having the strongest available signal. In order to track available signals, the mobile station maintains a list of available base stations. Specifically, each base station in the CDMA system transmits an unmodulated pilot signal on a set of predetermined frequencies. A searcher unit in the mobile station detects the pilot signals and measures the strength thereof. The results from the searcher are reported to the current base station. The base station then instructs the mobile station to update a list of available base stations maintained by the mobile station. The list is sub-divided into an active set, a candidate set, and a neighbor set. The active set contains a list of base stations currently communicated with the mobile station. The candidate set is a list of base stations which may move into the active set. The neighbor set is a list of base stations which are being monitored, but less frequently.

As the mobile station moves and departs from a base station, the currently active signal sent from the base station weakens. The mobile station must access a new base station. The communication link must be handed off to the next base station. Two types of handoff, soft and hard, are employed in communication systems. In a soft handoff, a new link is established before an original link is terminated. In a hard handoff, a connection with a currently active base station (i.e., 3G) is terminated before a new connection with a new base station (i.e., 2G) is established.

Figure 1:
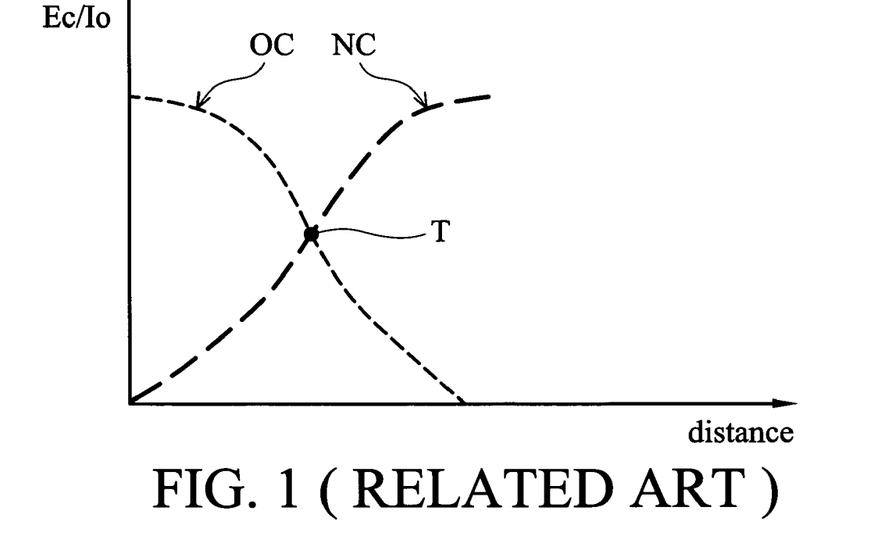
FIG. 1 is a schematic diagram illustrating a 3G soft handoff.

Conventionally, in CDMA systems, the mobile station and base station perform handoff according to the pilot strength (Ec) and the total received power (Io) (Ec/Io). When the mobile station moves and the currently active pilot signal weakens, the mobile station must access a new base station and complete a 3G soft handoff. When the mobile station moves to a new 3G cell, the received pilot of the old cell will decrease and the received pilot of new cell will increase, as shown in FIG. 1. Curve OC indicates the Ec/Io value of the old cell, and curve NC indicates that of the new cell. At point T, a 3G soft handoff is performed. The best pilot transfers the pilot of the old cell to that of the new cell.

Figure 2:
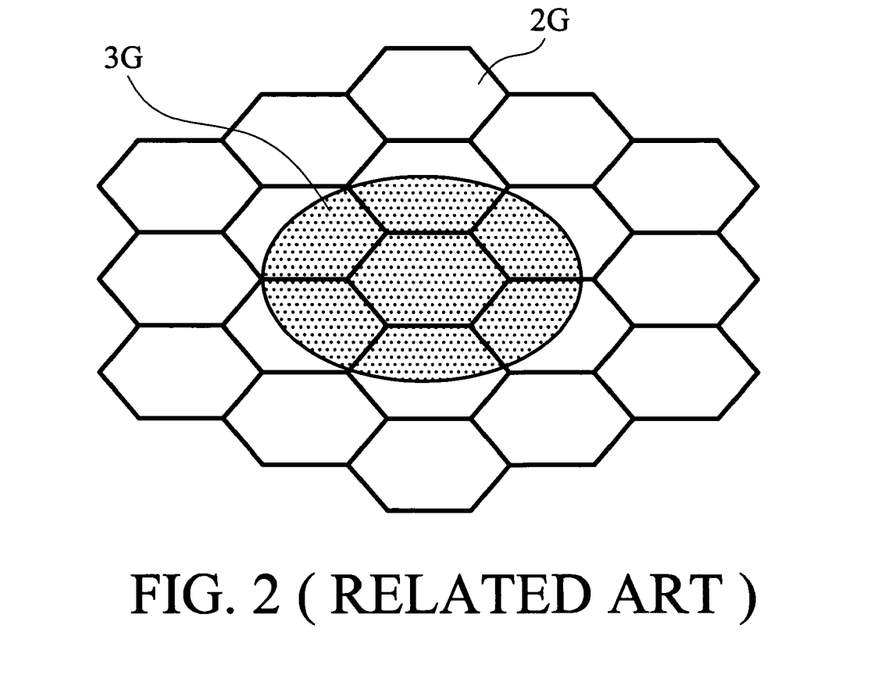
FIG. 2 is a schematic diagram illustrating the relationship of 3G and 2G systems.
Figure 8:
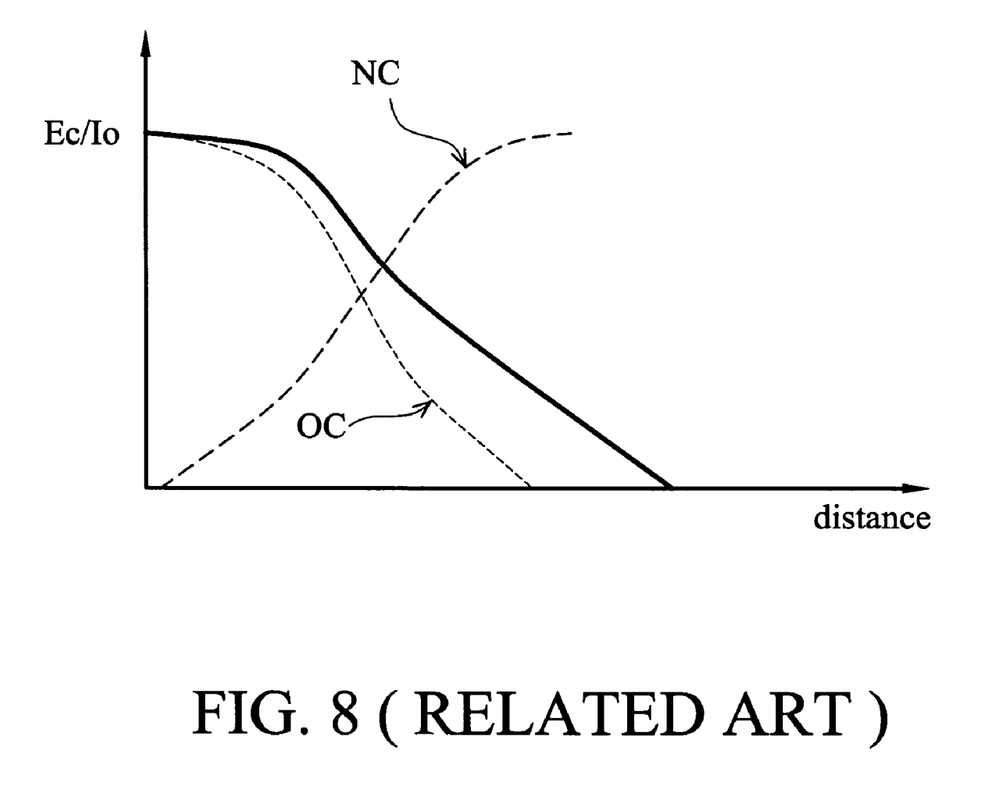
FIG. 8 is a schematic diagram illustrating the relationship between the pilot strength and distance in a border cell.

Currently, 2G systems provide the most worldwide coverage. In the near future, 3G systems will be deployed on top of 2G systems to provide more advanced services, as shown in FIG. 2. On border cells, however, 2G and 3G systems operate in different frequency bands. When the mobile station leaves the 3G coverage and accesses the area of 2G system, the pilot Ec/Io will decrease and no new 3G base stations can be accessed by the mobile station, as shown in FIG. 8. The dotted curves indicate the Ec/Io values of inner cells to be handed off. Therefore, the pilot Ec/Io will be maintained at a constant level for a significant range regardless of distance. As a result, Ec/Io is not a good criterion for determining handoff timing at border cells of the 2G and 3G systems, or an indication of quality degradation. Due to the differences in coverage between the 2G and 3G systems, it is desirable to provide a 3G to 2G handoff mechanism without losing the 3G system capacity.

SUMMARY

Handoff methods, and devices utilizing same, are provided. In an exemplary embodiment of a handoff method, a mobile station records the strength (Ec) of a pilot signal from a cell as a reference strength (Eref) if a handoff occurs in a first system. The mobile station performs a handoff between the first and a second system if the strength (Ec) of the pilot signal reaches the reference strength (Eref). The first system is the third generation (3G) CDMA (Code Division Multiple Access) system and the second system is the second generation (2G) CDMA system.

In some embodiments of a handoff method, a mobile station records the strength (Ec) of a pilot signal from a cell as a reference strength (Eref) if a handoff occurs in a first system. The mobile station then adjusts the reference strength (Eref) according to the effect caused by forward and reverse links between a base station and the mobile station, and performs a handoff between the first and a second system if the strength (Ec) of the pilot signal reaches the reference strength (Eref).

The reference strength (Eref) is adjusted by a correction factor generated according to a received strength for the forward link and a signal to noise ratio for the reverse link.

Methods for border cell handoff may take the form of program code embodied in a tangible media. When the program code is loaded into and executed by a machine, the machine becomes an apparatus for practicing the disclosed method.

DESCRIPTION OF THE DRAWINGS

Methods for border cell handoff, and devices utilizing same will become more fully understood by referring to the following detailed description with reference to the accompanying drawings, wherein.

DESCRIPTION

Figure 3A:
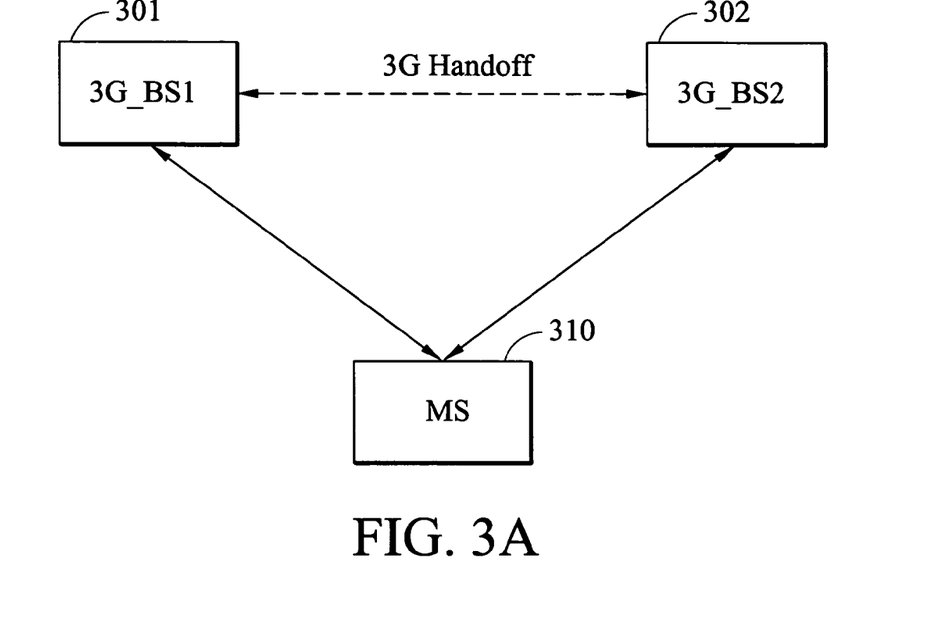
FIG. 3A shows a handoff between a mobile station and 3G base stations.
Figure 3B:
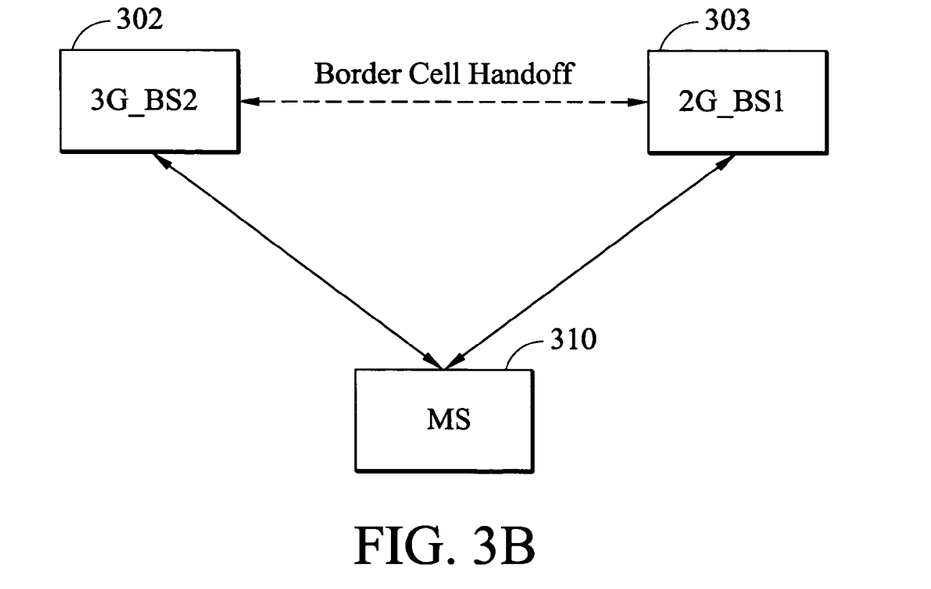
FIG. 3B shows a handoff between a mobile station and 2G and 3G base stations.

Handoff methods and devices utilizing same are provided. FIG. 3A shows an exemplary embodiment of a method of handoff between a mobile station and 3G base stations. As shown in FIG. 3A, a mobile station MS (310), such as a mobile phone can perform a 3G soft handoff between 3G base stations 3G_BS1 (301) and 3G_BS2 (302). FIG. 3B shows the handoff between a mobile station and 2G and 3G base stations. At border cells of the 3G and 2G CDMA systems, the mobile station MS (310) can determine a trigger timing of border cell handoff between 3G and 2G systems, such that the service of the mobile station MS (310) can be handed off from the 3G base station 3G_BS2 (302) to a 2G base station 2G_BS1 (303). In some embodiments of handoff methods, the mobile station may comprise a processing unit for performing handoff methods.

Figure 4:
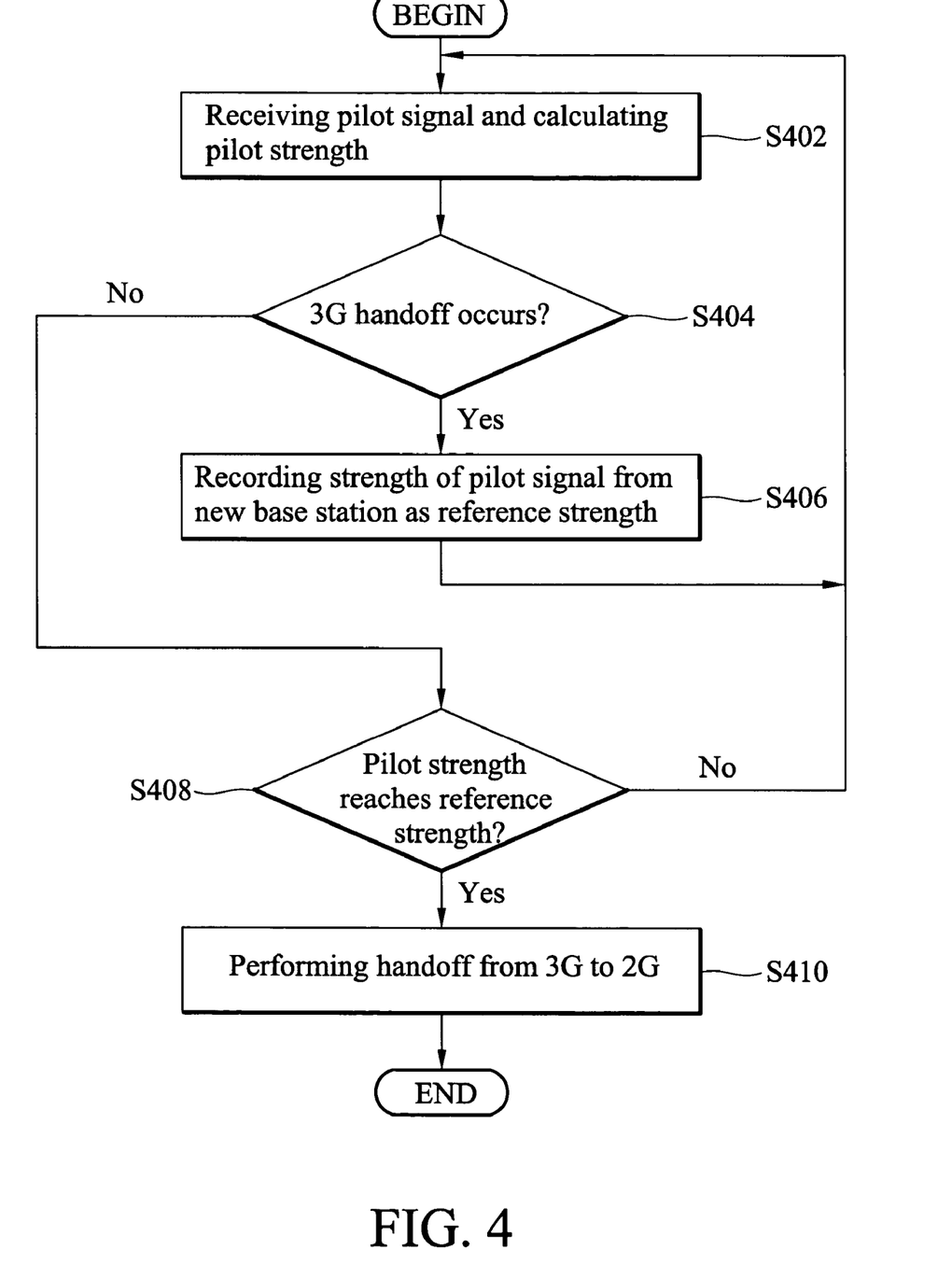
FIG. 4 is a flowchart showing an embodiment of a handoff method.

FIG. 4 is a flowchart showing an exemplary embodiment of a handoff method, suitable for use in a mobile station, for determining trigger timing of border cell handoff between 3G and 2G systems.

First, in step S402, the mobile station receives at least a pilot signal from a 3G base station currently serving the mobile station, and calculates the pilot strength Ec of the pilot signal. It is understood that the mobile station cannot measure Ec directly, but can only measure pilot Ec/Io. Ec can be obtained by calculating Ec=(Ec/Io )×Io (total received power).

Figure 5:
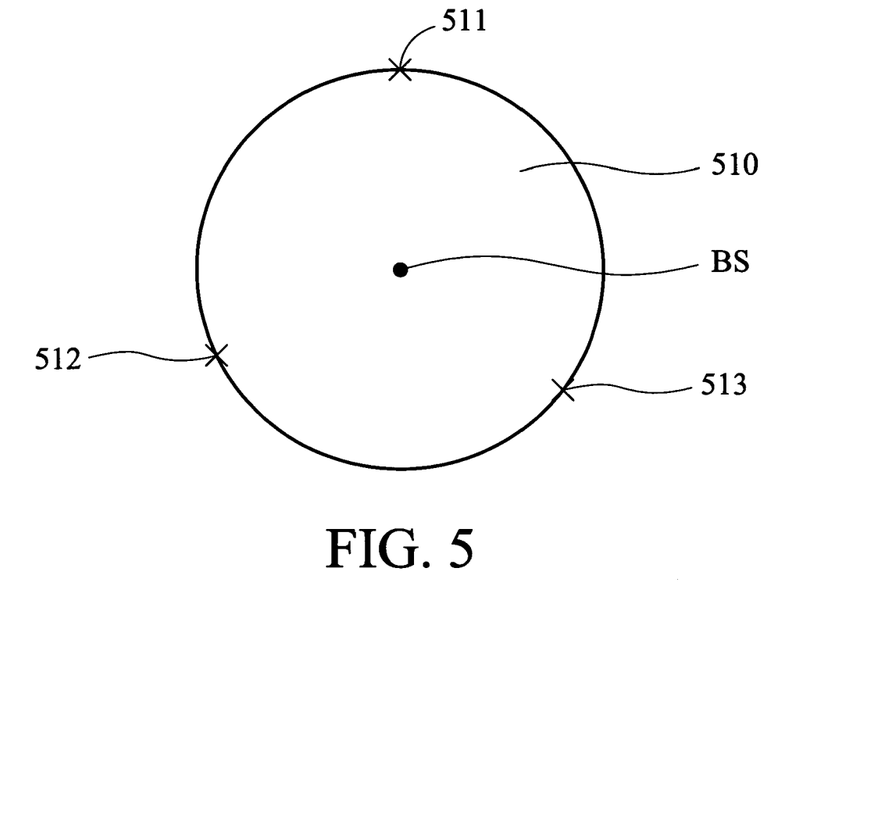
FIG. 5 is a schematic diagram illustrating the pilot strength of a serving cell.

In step S404, it is determined whether a 3G handoff has occurred. If so (Yes in step S404), in step S406, the mobile station records the strength Ec of a pilot signal from a new 3G cell as a reference strength Eref, and the procedure returns to step S402. FIG. 5 is a schematic diagram illustrating the pilot strength Ec of a serving cell. Since the pilot strength Ec of a serving cell 510 is dependent on the distance between a mobile station and a base station BS, the pilot strength Ec is similar at the radius (points 511, 512, and 513) of the cell 510. This property (similar pilot strength at radius) is helpful in determining trigger timing. If not (No in step S404), in step S408, it is determined whether the pilot strength Ec of the pilot signal from the serving base station reaches the reference strength Eref. If not (No in step S408), the procedure returns to step S402. If so (Yes in step S408), in step S410, the mobile station performs a handoff from a 3G to a 2G system.

It is understood that when the mobile station accesses a new cell, the mobile station calculates and records the new Ec value, and then refreshes the Eref. If the mobile station accesses the border cells, three cases are possible. First, the mobile station stops in the border cell. Second, the mobile station accesses other border cells or accesses an inner cell. Third, the mobile station leaves the border cell and accesses the 2G system. In the first case, since the received Ec will not reach the Eref value, the trigger timing will not be confused. In the second case, since the 3G soft handoff will happen before the received Ec reaches the Eref value, the mobile station will not mistakenly hand off to the 2G system. In the third case, since no further 3G cells can refresh the Ec value, the received Ec will reach the Eref value and correctly trigger the 3G system to the 2G system.

Figure 6:
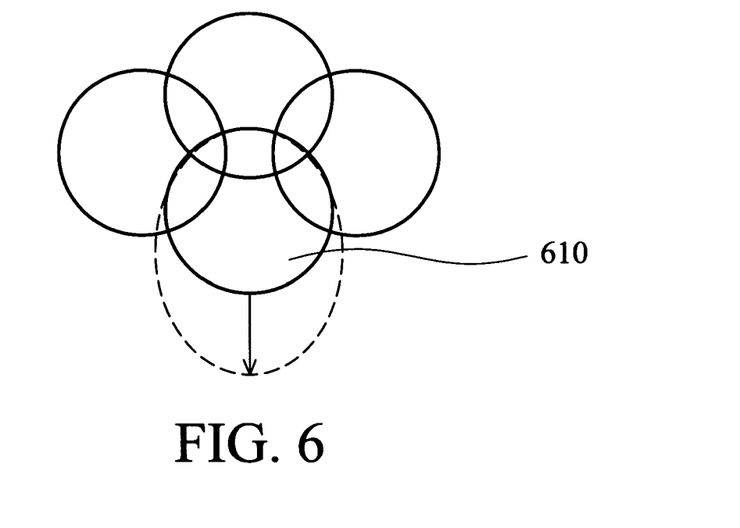
FIG. 6 is a schematic diagram illustrating the coverage extension of a border cell.

Since multiple 3G cells surround and encroach each other, the coverage region of an inner 3G cell is closed to other cells, and the coverage regions can be uniform and have roughly the same size. A border cell, however, does not have a uniform coverage region since some part of the border cell is not encroached upon neighbor cells. Thus, the coverage region of a border cell 610 can be extended as shown in FIG. 6. In forward link view, the interference (Iother) in a border cell is less than that of an inner cell, and the pilot strength will decrease less rapidly. That is, the forward link coverage will extend. In reverse link view, the total received power in base stations of a border cell is less than that of an inner cell. The required Ec/Io will decrease, and the mobile station can use less power to transmit signals. That is, the reverse link coverage able to be extended. If a mobile station still recognizes the previous Eref as the trigger timing, the 3G system is not fully utilized. To sufficiently utilize the resources of 3G system sufficiently, the Eref can be further adjusted to delay the trigger timing.

Figure 7:
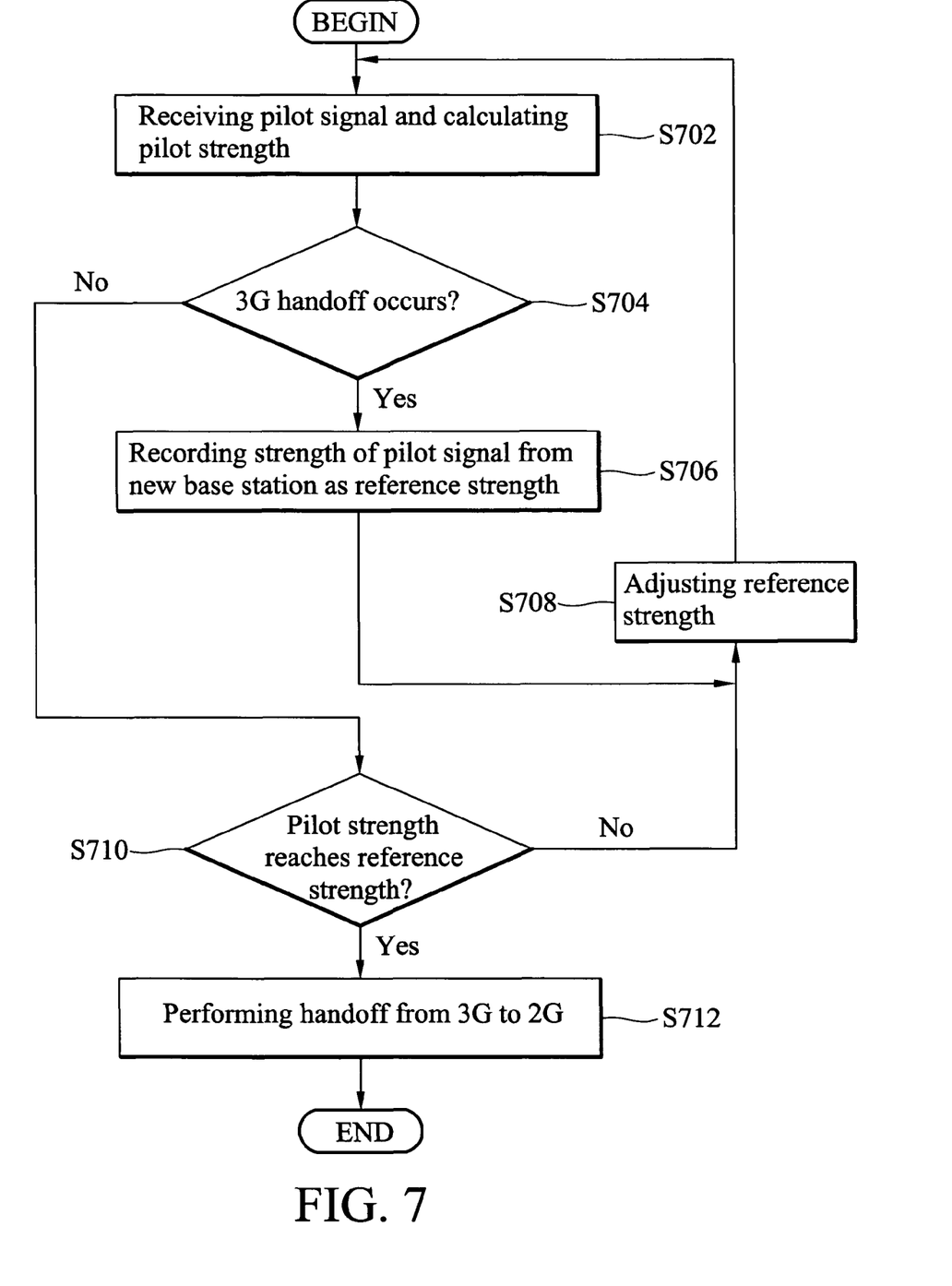
FIG. 7 is a flowchart showing an embodiment of a handoff method.

FIG. 7 is a flowchart showing an embodiment of a handoff method, suitable for use in a mobile station, for determining a trigger timing of border cell handoffs between 3G and 2G systems. In some embodiments, the reference strength is further adjusted to efficiently utilize the 3G system.

First, in step S702, the mobile station receives at least a pilot signal from a 3G base station currently serving the mobile station, and calculates the pilot strength Ec of the pilot signal. The mobile station cannot measure Ec directly, but can only measure pilot Ec/Io, Ec can be obtained by calculating Ec=(Ec/Io )×Io (total received power). In step S704, it is determined whether a 3G handoff has occurred. If so (Yes in step S704), in step S706, the mobile station records the strength Ec of a pilot signal from a new 3G cell as a reference strength Eref. In step S708, the reference strength Eref is continuously adjusted according to the effect caused by forward and reverse links between base station and mobile station. The reference strength Eref is adjusted by a correction factor generated according to a received strength for the forward link and a signal to noise ratio for the reverse link. The range of the correction factor Δ is discussed in the following.

If the value of Δ is too small, it will only trigger a handoff early and not cause a call to be dropped. If the value of Δ is too large, however, it will trigger a handoff too late resulting in a dropped call. Before generation of the range of Δ, several equations are considered.

The pass loss at a distance d to a mobile station, as measured from a base station is modeled as (in dB):

$$10\log L(d, \zeta) = 10\log\left[d^{\gamma}10^{\frac{\zeta}{10}}\right] = 10\gamma\log d + \zeta, \quad \text{(Eq. 1)}$$

where d is the distance, ζ is the attenuation due to shadowing effects, and γ is the path loss exponent. The pass loss will increase when the distance enlarges.

The reverse link capacity is based on:

$$\frac{E_b}{I_o} = \frac{\frac{S}{R}}{FN_{th} + \frac{I_{other,ms}}{W}} = G\frac{S}{FN_{th}W + I_{other,ms}}, \quad \text{(Eq. 2)}$$

where Eb is the bit energy, Io is the power spectral density of thermal noise plus interference, F is the base station noise figure, $N_{th}$ is the power special density of thermal noise, S is the received signal strength, R is the bit rate, W is the system bandwidth, G and W/R are the processing gain, and $I_{other,ms}$ is the total received power of base stations.

The base stations base on the total received power ($FN_{th}W+I_{other,ms}$) and the required signal to noise ratio (Eb/Io) to determine the strength of received power (S) transmitted from a mobile station.

If the mobile station cannot transmit more power to reach the required power S in base stations, the reverse link capacity achieves the maximum.

The coverage for reverse link is based on:

$$S = (FN_{th}W + I_{other,ms}) \times \frac{E_b}{I_o} \times \frac{1}{G}, \quad \text{(Eq. 3)}$$

and $$d \leq \left(\frac{P^t\max \times G_m \times G_b}{l_0 \times M \times S}\right)^{\frac{1}{\gamma}}, \quad \text{(Eq. 4)}$$

where lo is the one-mile intercept loss, Gm is the mobile station gain, Gb is the base station gain, M is the additional link margin to account for fading under soft handoffs, and Pmax is the mobile transmission power. Equation 3 can be obtained from equation 2, and equation 4 can be obtained from equations 1, 3, and the mobile station maximum transmission power by setting lo=10^(ζ/10). When the mobile station transmission maximum power has pass loss, the base station calculates the required received power S based on cell loading. The reverse link maximum coverage is then determined.

The coverage for forward link is based on four equations as shown below:

$$\frac{E_{c,pilot}}{I_o} = \frac{E_{c,pilot}}{FN_{th} + I_{sc,o} + I_{oc,o}}, \quad \text{(Eq. 5)}$$

$$E_{c,pilot} = \frac{\mu P_b}{R_{chip}} \times \frac{G_b^{Ant,Tx} \times G_m^{Ant,Rx}}{L_f(d) \times L_b^{Tx} \times L_m^{Rx}}, \quad \text{(Eq. 6)}$$

$$I_{sc,o} = \frac{(1-\mu)P_b}{W} \times \frac{G_b^{Ant,Tx} \times G_m^{Ant,Rx}}{L_f(d) \times L_b^{Tx} \times L_m^{Rx}}, \text{ and} \quad \text{(Eq. 7)}$$

$$I_{oc,o} = \frac{P_b}{W} \times \sum_{j=1}^{J} \frac{G_b^{Ant,Tx} \times G_m^{Ant,Rx}}{L_f(d) \times L_b^{Tx} \times L_m^{Rx}}, \quad \text{(Eq. 8)}$$

where Isc,o is the interference of the same base station, Ioc,o is the interference of adjacent base stations, Pb is the power per CDMA carrier at the base station transmit filter input, μ is the fraction of base station power for the pilot, Rchip is the chip rate of the pilot, L is the loss, and L(d) is the path loss.

From equations 1 to 8, the relationship between Δ and reverse and forward links can be generated. First, the equation 4 is operated and d, lo, and γ by Lr(d) are replaced to obtained a following equation 9.

$$M \times S \leq \frac{P_{\max}^t \times G_b^{Ant,Rx} \times G_m^{Ant,Tx}}{L_r(d) \times L_b^{Rx} \times L_m^{Tx}}, \quad \text{(Eq. 9)}$$

where P is the mobile station transmit power, G is the gain, L is the loss, L(d) is the path loss, M is the additional link margin to account for fading under soft handoff, S is the required received signal strength for N mobile stations. And the equation 9 is transposed. The upper bound of pass loss Lr(d) of the reverse link is shown in equation 10.

$$L_r(d) \leq \frac{P_{m,\max}^t \times G_b^{Ant,Rx} \times G_m^{Ant,Tx}}{M \times S \times L_b^{Rx} \times L_m^{Tx}} = \frac{Y}{S}. \quad \text{(Eq. 10)}$$

The pass loss must less than Y/S, in which Y is proportional to the mobile station maximum transmission power, and $$Y=(Pm,\max \times Gb \times Gm)/(M \times Lb \times Lm).$$

Second, (μPb/Rchip)×(Gb×Gm)/(Lb×Lm)3=X is set from the equation 6, and the following equation 11 is obtained.

$$E_{c,pilot} = \frac{\mu P_b}{R_{chip}} \times \frac{G_b^{Ant,Tx} \times G_m^{Ant,Rx}}{L_f(d) \times L_b^{Tx} \times L_m^{Rx}} = \frac{X}{L_f(d)}. \quad \text{(Eq. 11)}$$

The equation 11 is transposed to get the equation 12.

$$L_f(d) = \frac{X}{E_c}. \quad \text{(Eq. 12)}$$

From the equation 12, the forward link pass loss is equal to a constant division Ec.

The relationship of the forward and reverse links pass loss, base station received power S of one user, and mobile station received Ec is obtained. The equations 10, 12 are combined by replacing Lr(d) to Lf(d)=X/Ec to obtain the following relationship:

$$L_r(d) \leq \frac{Y}{S} \Rightarrow \frac{X}{E_c} \leq \frac{Y}{S} \Rightarrow E_c \geq \frac{X}{Y} \times S = A \times S. \quad \text{(Eq. 13)}$$

Thus, the value of Ec must be larger than A×S and the received Ec of mobile station must conform to the equation. Hence, the adjusted reference strength (Eref−Δ) also conforms to Ec≧A×S. Then, the range of Δ is obtained.

$$E_C \geq A \times S \Rightarrow E_C = E_{ref} - \Delta \geq A \times S \Rightarrow \Delta \leq E_{ref} - A \times S \quad \text{(Eq. 14)}.$$

The range of Δ must be smaller than Eref−(A×S). After the adjustment of the reference strength, the adjusted reference strength can be utilized for trigger timing determination. Thereafter, the procedure returns to step S702.

If no 3G handoff occurs (No in step S704), in step S710, it is determined whether the pilot strength Ec of the pilot signal from the serving base station reaches the adjusted reference strength Eref−Δ. If not (No in step S710), in step S708, the reference strength Eref is continuously adjusted according to the effect caused by forward and reverse links between base station and mobile station. The procedure returns to step S702. If so (Yes in step S710), in step S712, the mobile station performs a handoff from a 3G to a 2G system, such that the mobile station is served by a 2G base station.

Handoff methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A handoff method for use in a mobile station, comprising:

recording, by the mobile station, a first strength of a pilot signal from a serving cell of a 3G (third generation) CDMA (Code Division Multiple Access) system as a reference strength when a handoff occurs in the 3G CDMA system;

triggering, by the mobile station, a handoff from the 3G CDMA system to a 2G (second generation) CDMA system when the mobile station is at a border cell of the 3G CDMA system and a second strength of a pilot signal from the serving cell of the 3G CDMA system reaches the reference strength; and adjusting the reference strength by a correction factor as follows:

$\Delta \leq E_{ref} - A \times S,$ wherein $\Delta$ is the correction factor, $E_{ref}$ is the reference strength, S is a received signal strength of the mobile station, and $$A = \frac{X}{Y},$$

wherein X=($\mu$Pb/Rchip)×(Gb×Gm)/(Lb×Lm) and Y=(Pm,max×Gb×Gm)/(M×Lb×Lm), wherein Gb is a base station gain, Gm is a mobile station gain, M is an additional link margin to account for fading under soft handoffs, Pmax is a mobile transmission power, Pb is a power per carrier at the base station transmit filter input, $\mu$ is a fraction of base station power for the pilot, Rchip is a chip rate of the pilot, Lb is a base station loss, and Lm is a mobile station loss.

2. The method of claim 1 further comprising obtaining the first or second strength of the pilot signal by multiplying a pilot Ec/Io by a total received power Io of the mobile station.

3. A mobile phone, comprising:

a processing unit to record a first strength of a pilot signal from a serving cell of a 3G (third generation) CDMA (Code Division Multiple Access) system as a reference strength when a handoff occurs in the 3G CDMA system, and trigger a handoff from the 3G CDMA system to a 2G (second generation) CDMA system when the mobile phone is at a border cell of the 3G CDMA system and a second strength of the pilot signal from the serving cell of the 3G CDMA system reaches the reference strength, wherein the processing unit further adjusts the reference strength by a correction factor as follows:

$\Delta \leq E_{ref} - A \times S,$ wherein $\Delta$ is the correction factor, $E_{ref}$ is the reference strength, S is a received signal strength of the mobile phone, and $$A = \frac{X}{Y},$$

wherein X=($\mu$Pb/Rchip)×(Gb×Gm)/(Lb×Lm) and Y=(Pm,max×Gb×Gm)/(M×Lb×Lm), wherein Gb is a base station gain, Gm is a device gain, M is an additional link margin to account for fading under soft handoffs, Pmax is a mobile transmission power, Pb is a power per carrier at the base station transmit filter input, $\mu$ is a fraction of base station power for the pilot, Rchip is a chip rate of the pilot, Lb is a base station loss, and Lm is a device loss.

4. The mobile phone of claim 3 wherein the processing unit further obtains the first or second strength of the pilot signal by multiplying a pilot Ec/Io by a total received power Io of the mobile phone.

* * * * *